United States Patent [19]
Chin

[11] Patent Number: 5,915,138
[45] Date of Patent: Jun. 22, 1999

[54] EXTERIOR FILM-FEEDING CAMERA

[75] Inventor: Hsin-Yuan Chin, Taipei, Taiwan

[73] Assignee: Sammy Chu, Laguna Niguel, Calif.

[21] Appl. No.: 09/005,718

[22] Filed: Jan. 12, 1998

[51] Int. Cl.[6] ................................ G03B 1/00
[52] U.S. Cl. .................................................. 396/416
[58] Field of Search ........................... 396/387, 401, 396/411, 416

[56] References Cited

U.S. PATENT DOCUMENTS

| | | | |
|---|---|---|---|
| 1,676,037 | 7/1928 | Lowkrantz | 396/416 |
| 2,367,195 | 1/1945 | Bolsey | 396/416 |

*Primary Examiner*—Howard B. Blankenship
*Attorney, Agent, or Firm*—W. Wayne Liauh

[57] ABSTRACT

An exterior film-feeding camera is disclosed which contains: (a) a main body and an exposed space on one side of the main body for anchoring a film shell; (b) a vertical plate movably disposed on a rear surface of the main body, the vertical plate contains an elastic upper advancing plates and an elastic lower advancing plates for protruding into corresponding punched holes of a film so as to cause the film to be advanced; (c) an actuating member connected to an top end of the vertical plate, the actuating member contains first driving claw, second driving claw, and third driving claw, for driving a shutter safety plate, for triggering a shutter actuating plate connected to a shutter, and for rotating a uni-directional gear for a pre-set angle, respectively; and (d) a film-advancing node provided on a rear surface of the main body which is connected to the vertical plate so as to cause the vertical plate to move horizontally.

5 Claims, 9 Drawing Sheets

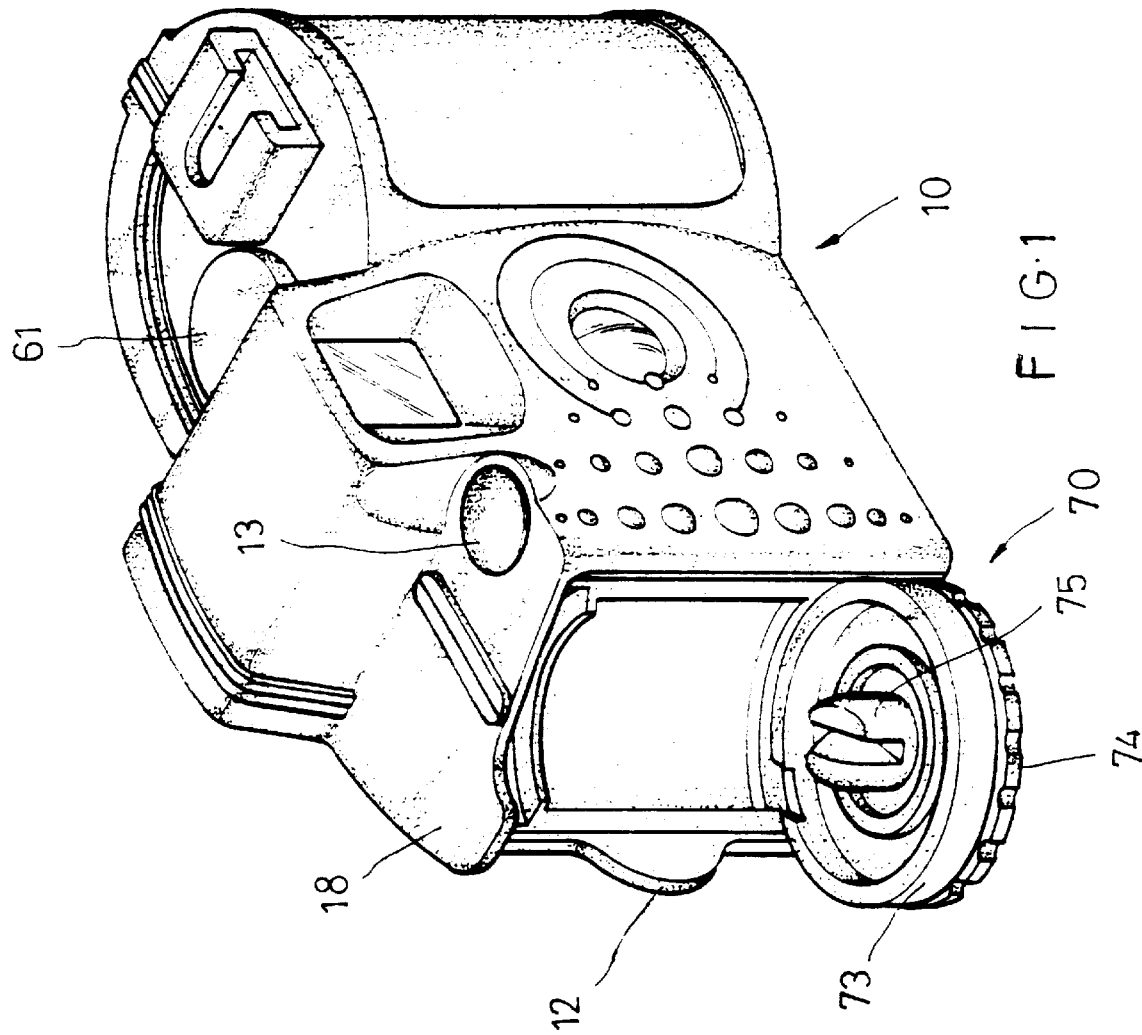
FIG·1

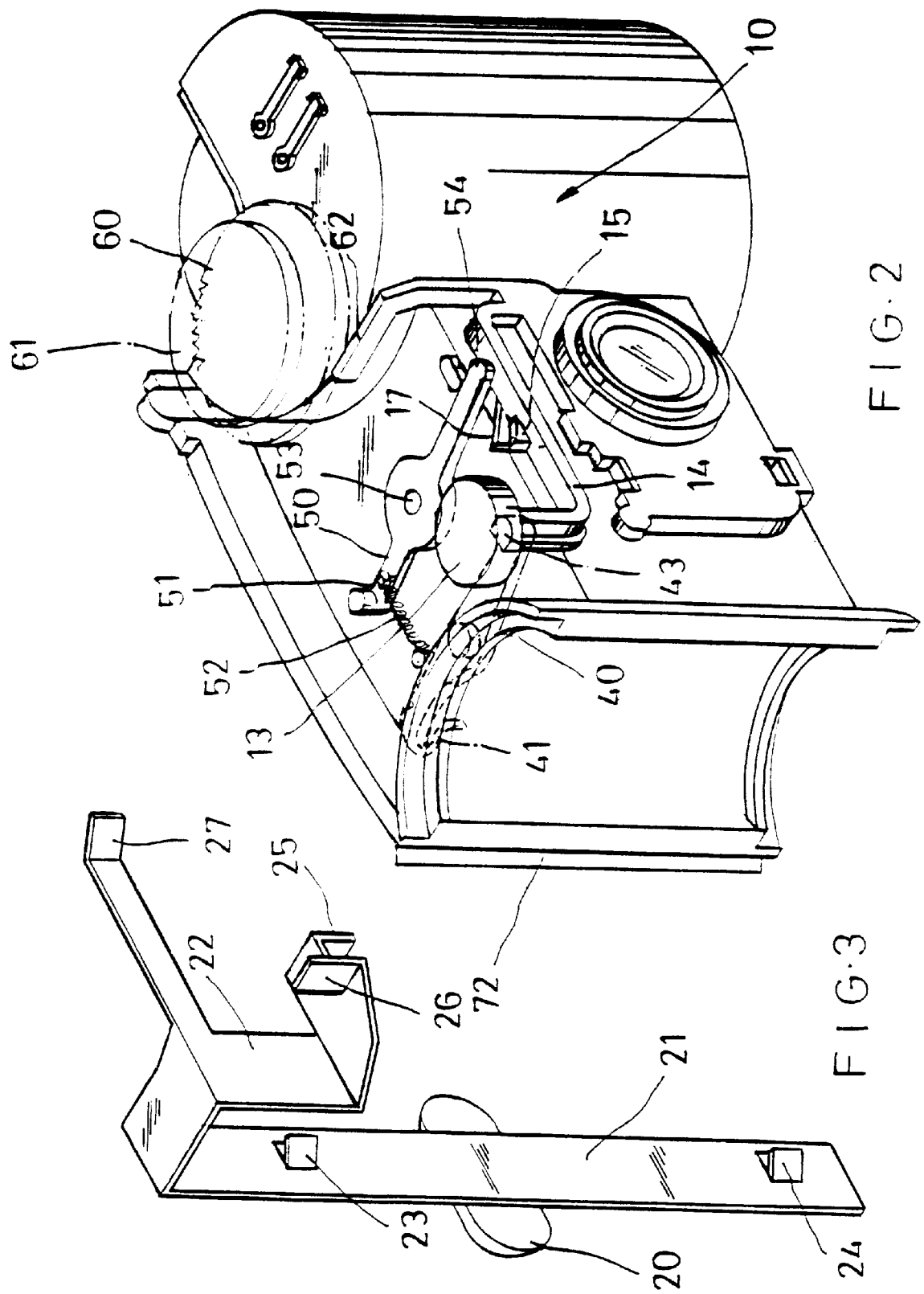

EXTERIOR FILM-FEEDING CAMERA

BACKGROUND OF THE INVENTION

(1) Field of the Invention

The present invention relates to an exterior film-feeding camera and is especially to a 35-mm film camera. By a compact film advancing plate, shutter actuating, film counting, together with an exterior film-feeding mechanism, the camera is constructed that is both compact and lightweight.

(2) Description of the Prior Art

Although the current camera technology is now focused on the digital camera which provides improved convenience, yet the conventional cameras, such as the single-lens camera, the automatic camera, and the disposal camera, still have their own market. For example, the single-lens camera facilitates the adjusting of focus, shutter, and photo-taking head better and allows a variety of the photographing operations. The automatic camera (known as a fools camera) operates extremely easily and is widely used for its convenience. The disposable camera at lower price solves the embarrassing situation wherein a camera is not available but is immediately needed. However, some consider using a single-lens camera requires advanced photo-taking technique, and is expensive, thus is not desirable. Some consider the automatic camera is always at a higher price and there is no justified reason to purchase one if photo-taking is occasional. The major shortcoming of the disposable camera is the non-refillable film system, which makes a higher unit price for single photo taking.

Therefore, an invention devoting to resolving aforesaid disadvantages of conventional cameras is definitely necessary.

SUMMARY OF THE INVENTION

Accordingly, it is a primary object of the present invention to provide an exterior film-feeding camera for 35-mm film model, which is constructed in a more compact and portable manner by applying plate switching, shutter safety assuring, shutter plate driving, and film counting.

It is another object of the present invention to provide an exterior film-feeding camera which can refill the film shell for multiple usage, so that the merits of both the convenience of an automatic camera and the advantage of low price of a disposable camera can be achieved.

The present invention is a manual simple-structured camera, which has an exposed accommodation space on one side of the camera's main body for anchoring a film shell. By providing a film-advancing node, various functions such as shutter safety assurance, readiness of an shutter actuating plate, and exposed film counting can be achieved.

The film-advancing node according to the present invention further drives an upper and a lower elastic switching plates to engage with the upper and the lower punch holes of the film for film advancing. The movement of the film-switching node also drives an actuating plate, which further comprises three switching claws for driving the safety plate, shutter actuating plate, and a uni-directional gear to accomplish the shutter safety assurance, readiness of an shutter actuating plate, and film counting, respectively.

All these objects are achieved by the exterior film-feeding camera described below.

BRIEF DESCRIPTION OF THE DRAWINGS

The present invention will now be specified with reference to its preferred embodiment illustrated in the drawings, in which FIG. 1 is a prospective view of the preferred exterior film-feeding camera in accordance with the present invention.

FIG. 2 is a schematic view of the transmission unit of the preferred exterior film-feeding camera in accordance with the present invention.

FIG. 3 is a prospective view of the film-switching node of the preferred exterior film-feeding camera in accordance with the present invention.

DESCRIPTION OF THE PREFERRED EMBODIMENT

Figure 4:
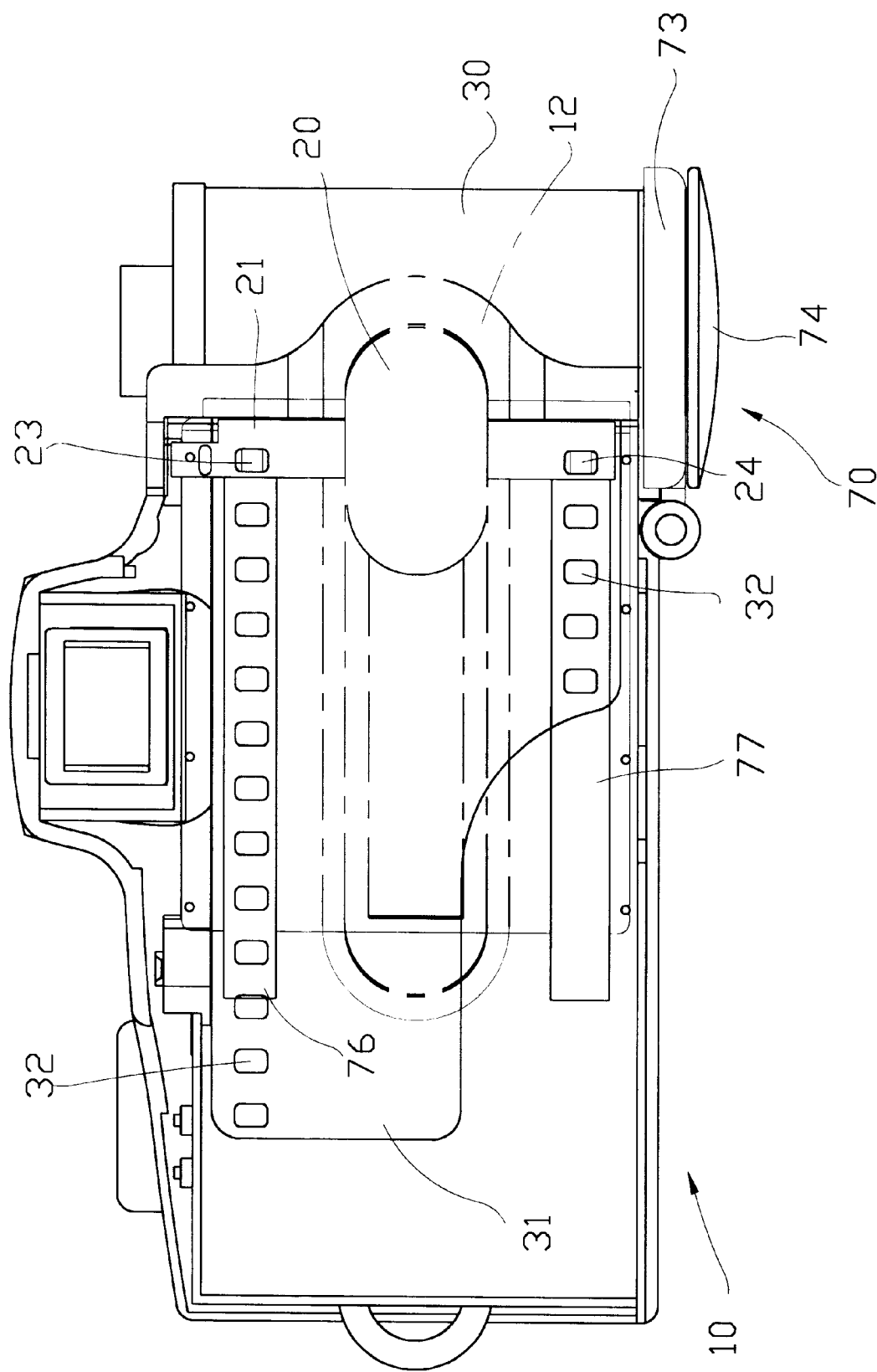
FIG. 4 is a schematic view showing the film-switching node driving the film in the preferred embodiment of the exterior film-feeding camera in accordance with the present invention.

The invention disclosed herein is directed to an exterior film-feeding camera. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The exterior film-feeding camera according to the present invention is especially designed as a simple-structured camera using a 35-mm film. The main body 10 of the camera has an accommodation space 11 to receive a film shell. A film-advancing node 20 is provided on the rear surface 12 of the main body 10 for driving a vertical plate 21 horizontally. On top of the vertical plate 21, an actuating part 22 is connected. Also, the vertical plate 21 further comprises an elastic upper switching plate 23 and an elastic lower switching plate 24. Both the switching plates 23 and 24 protrude in the advancing direction of the film 31. The actuating part 22 further comprises three switching claws 25, 26, and 27. The first switching claw 25 is utilized to drive an elastic safety plate 40, the second claw 26 is utilized to drive the actuating plate 50 of the shutter, and the third claw 27 is utilized to rotate a uni-directional gear 60 for a preset angle.

Figure 5:
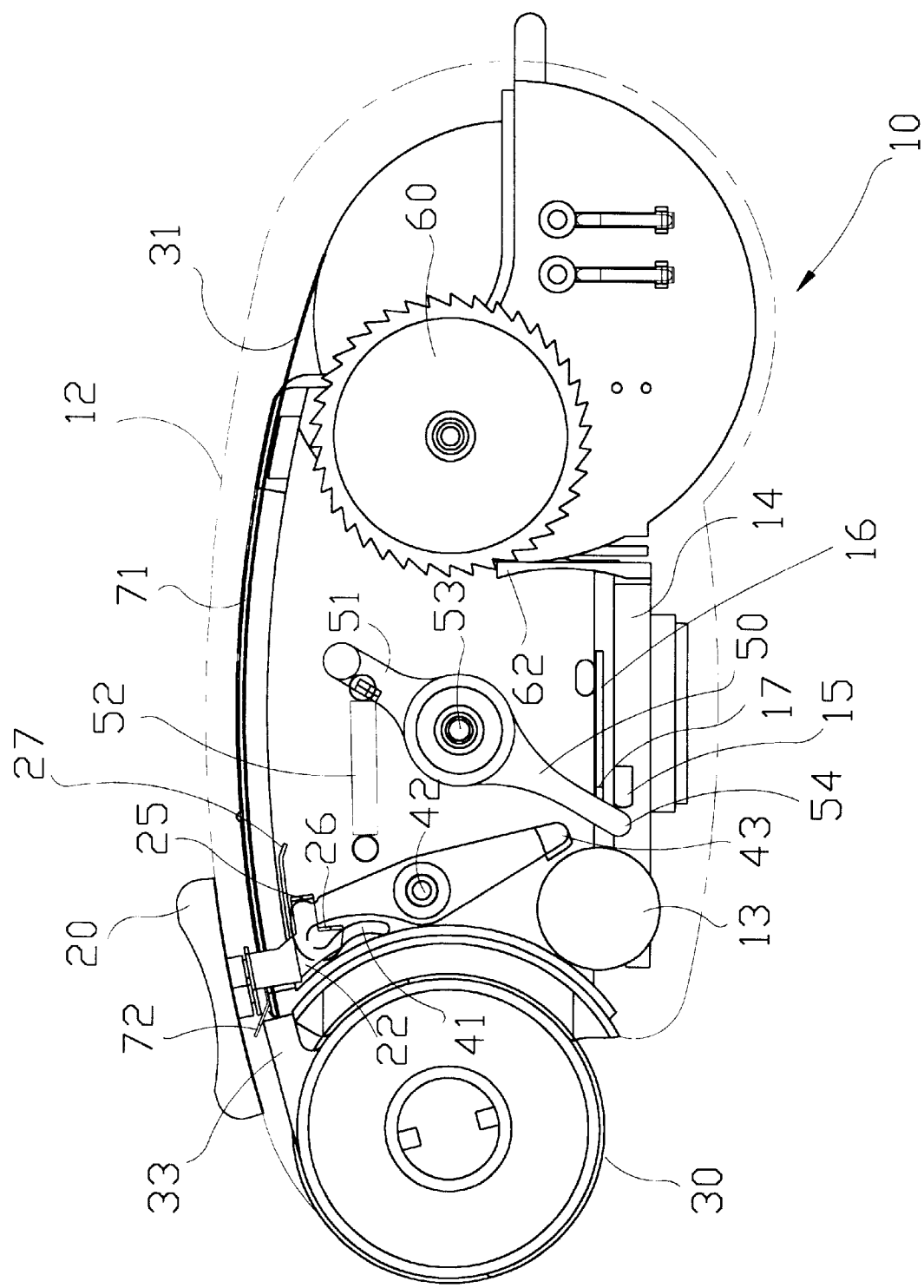
FIG. 5 is a top view of the transmission unit of the preferred exterior film-feeding camera in accordance with the present invention.

The safety plate 40 comprises a fluctuating part 41 on the rear part thereof. When the safety plate 40 is free of stress, its front end is stopped underneath the shutter 13 to prevent possible accidental shutter releasing. As shown in FIG. 5, when the film-advancing node 20 is at its original position, the first claw 25 of the actuating part 22 is at the position to actuate the rear end of the safety plate 40, to rotate the safety plate 40 about its own center pivot point 42. When this occurs, the front end 43 of the safety plate 40 is moved away from the shutter 13 on top, and thus the shutter 13 is available for another exposure. After the film-advancing node 20 is moved to back to its original position, the safety plate 40 resumes back to its origin by its elasticity, and moves its front end 43 back to the safety position under the shutter 13 for securing the shutter 13.

Figure 6:
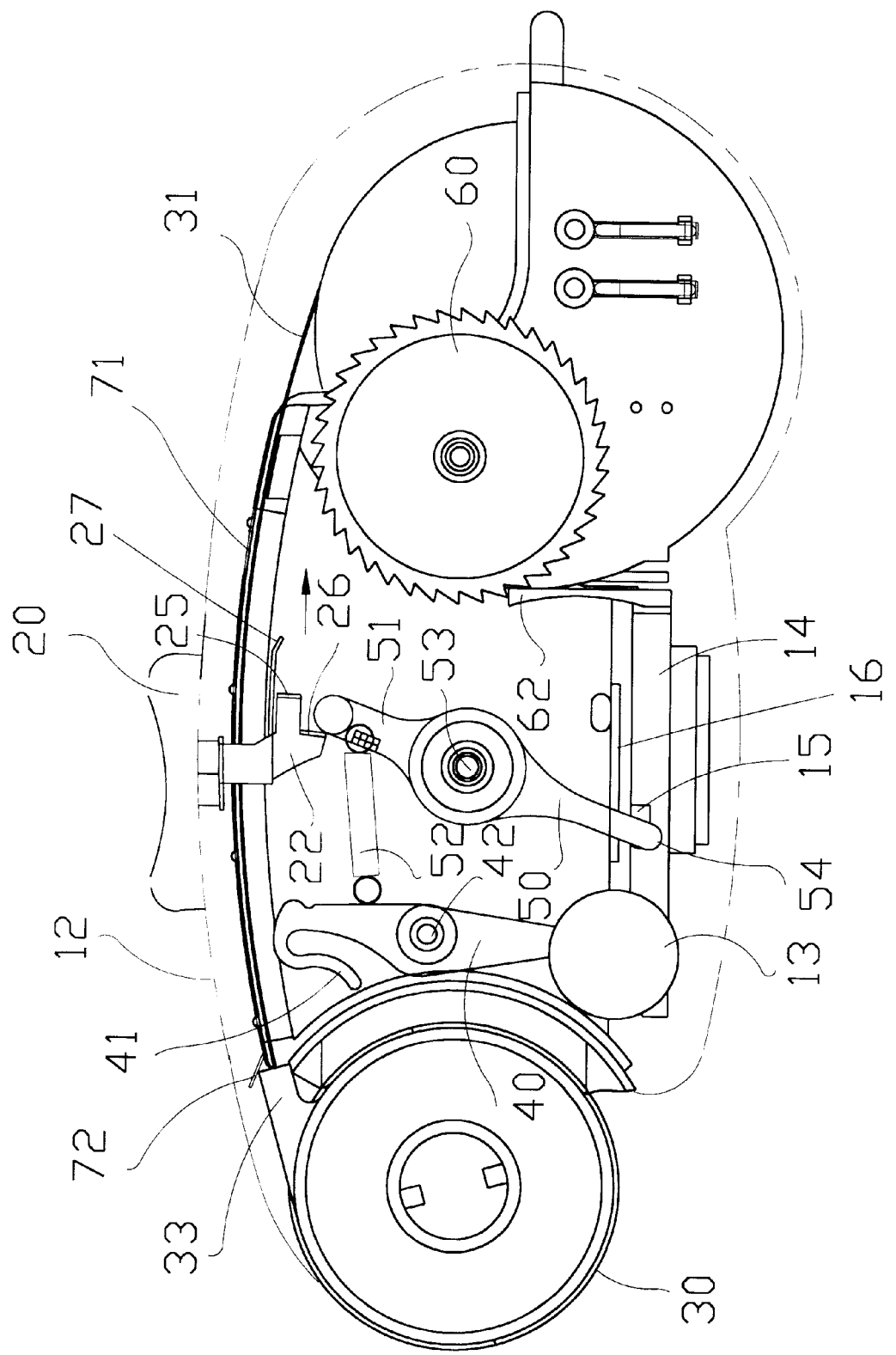
FIG. 6 is a schematic view of the preferred exterior film-feeding camera in accordance with the present invention at the status while the actuating part driving the actuating plate of the shutter.
Figure 7:
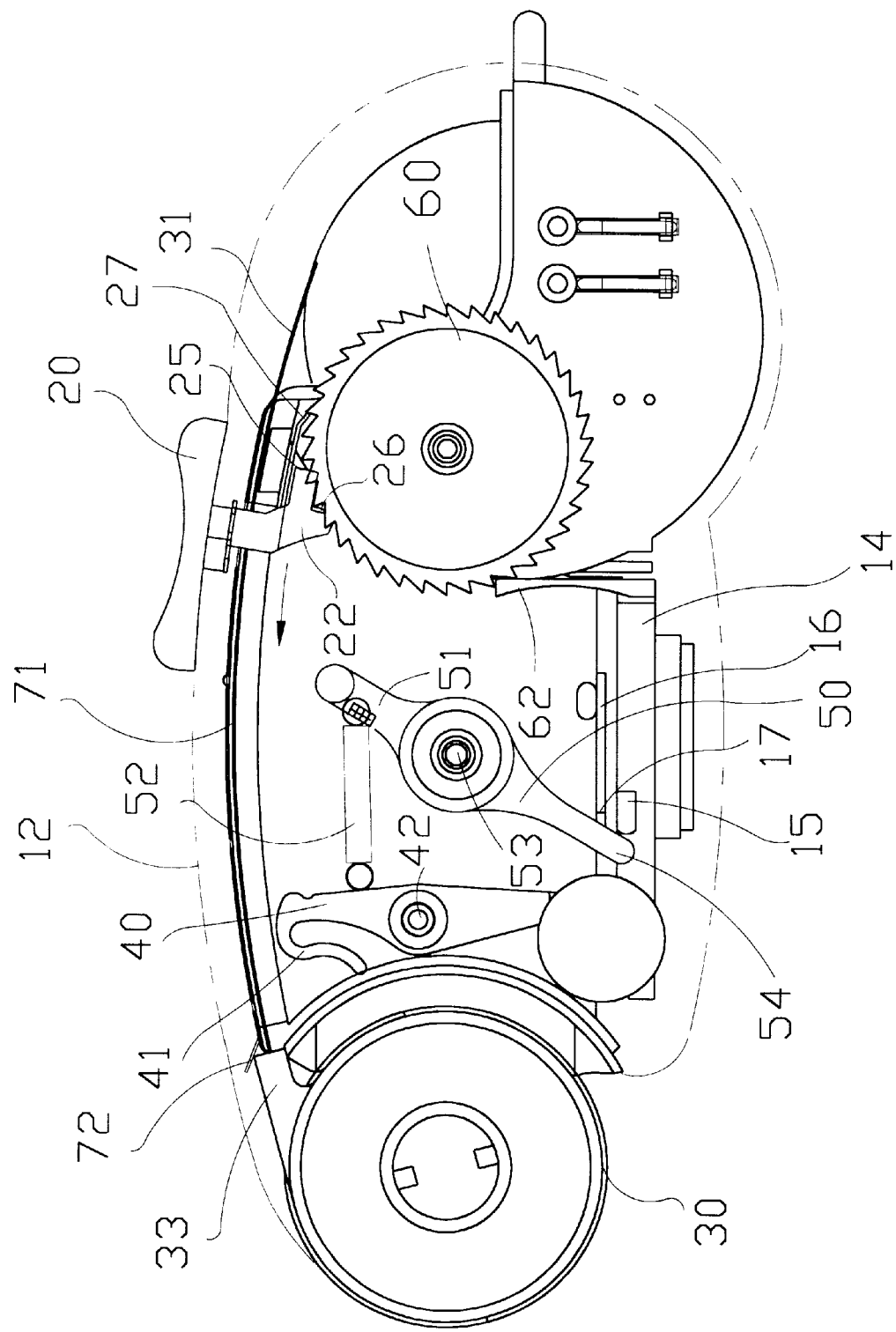
FIG. 7 is a schematic view of the preferred exterior film-feeding camera in accordance with the present invention at the status while the actuating part driving the uni-direction gear.

The shutter actuating plate 50 is pivotedly located at the pivot joint 53 at its center, and is restrained by a tension spring 52 connected on the rear end 51 of the shutter actuating plate 50. As shown in FIG. 6, while the film-advancing node 20 is moving to the right to carry out the film 31 conveying operation, the second claw 26 will push the rear end of the actuating plate 50 of the shutter to rotate about the pivot joint 53 located at its center. As illustrated in FIG. 7, at the rotation limit of the actuating plate 50, the front end 54 will be stopped by protruding point 15 of the lever 14 located under the shutter 13. At the same time when the actuating plate 50 passes the protruding point 15, the actuating plate 50 also passes the top end 17 of the shutter plate 16 and then the camera is ready for another exposure.

Referring now to FIG. 7, while the film-advancing node 20 moves the film 31 to the right to the film-advancing limit, the third claw 27 of the actuating part 22 will have rotated the uni-directional gear 60 for a preset angle. As the uni-directional gear 80 rotates the preset angle, a film 31 is advanced forwards and the user can read the number of the exposed films 31 from a counting disk 61 mounted on top of the uni-direction gear 60. The uni-directional gear 60 is restrained by a spring pin 62 to limit it to a single direction rotating.

When the film-advancing node 20 is pushed for film advancing operation, the two elastic advancing plates 23 and 24 will plug into the upper and the lower punch holes 32 of the film 31, respectively, so that the exposed film 31 can be driven forwards to the right and to the unexposed films 31 left in the dark space. When the film-advancing node 20 returns to the left to its origin, the two elastic advancing plates 23 and 24 will slip past the punch holes 32 of the film 31, so that the position of the film 31 can be sustained without reversed advancing. After the back-and-forth strokes of the film-advancing node 20, the film advancing operation is completed.

Figure 8:
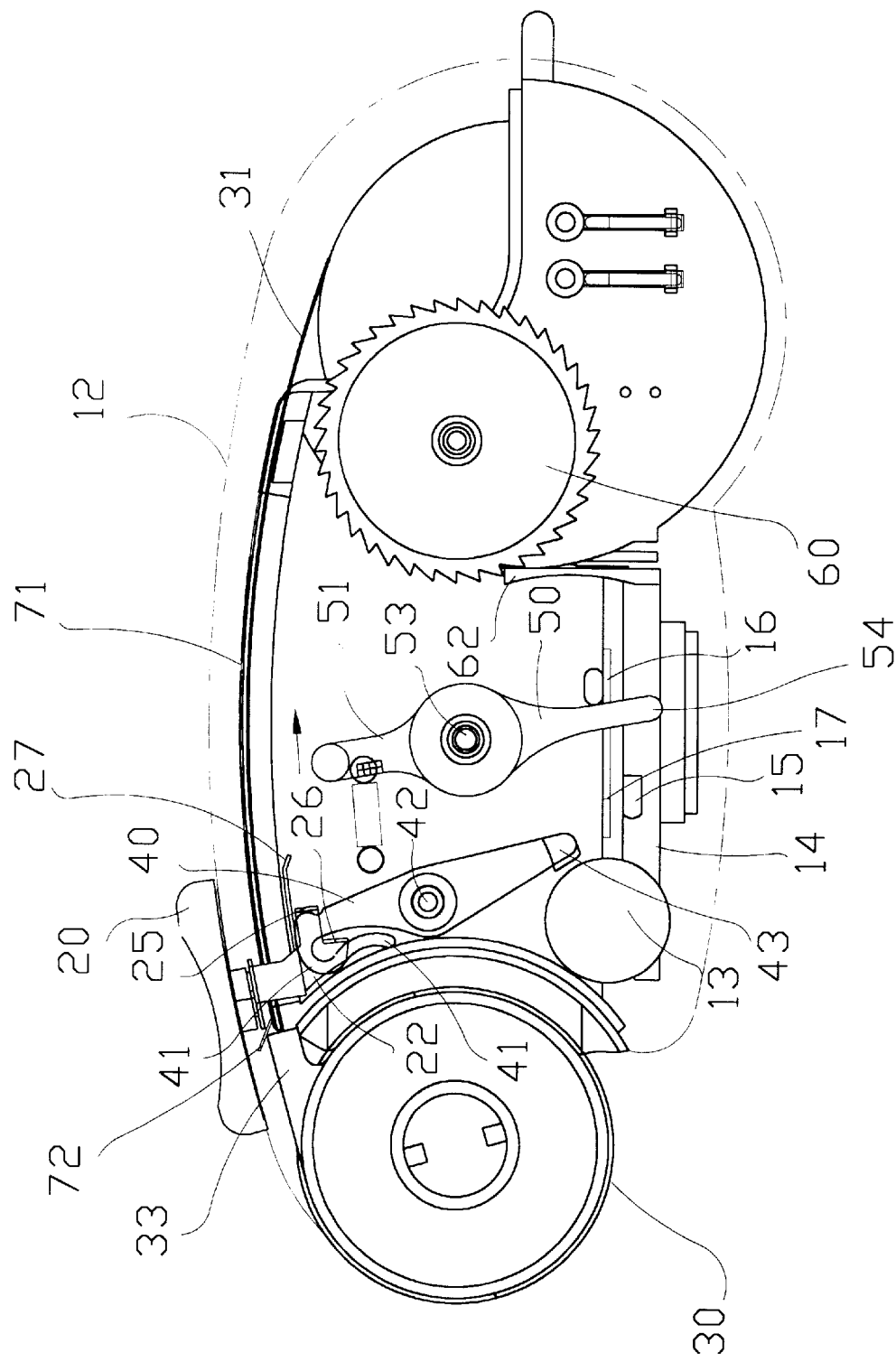
FIG. 8 is a schematic view of the preferred exterior film-feeding camera in accordance with the present invention at the status after an exposure.
Figure 9:
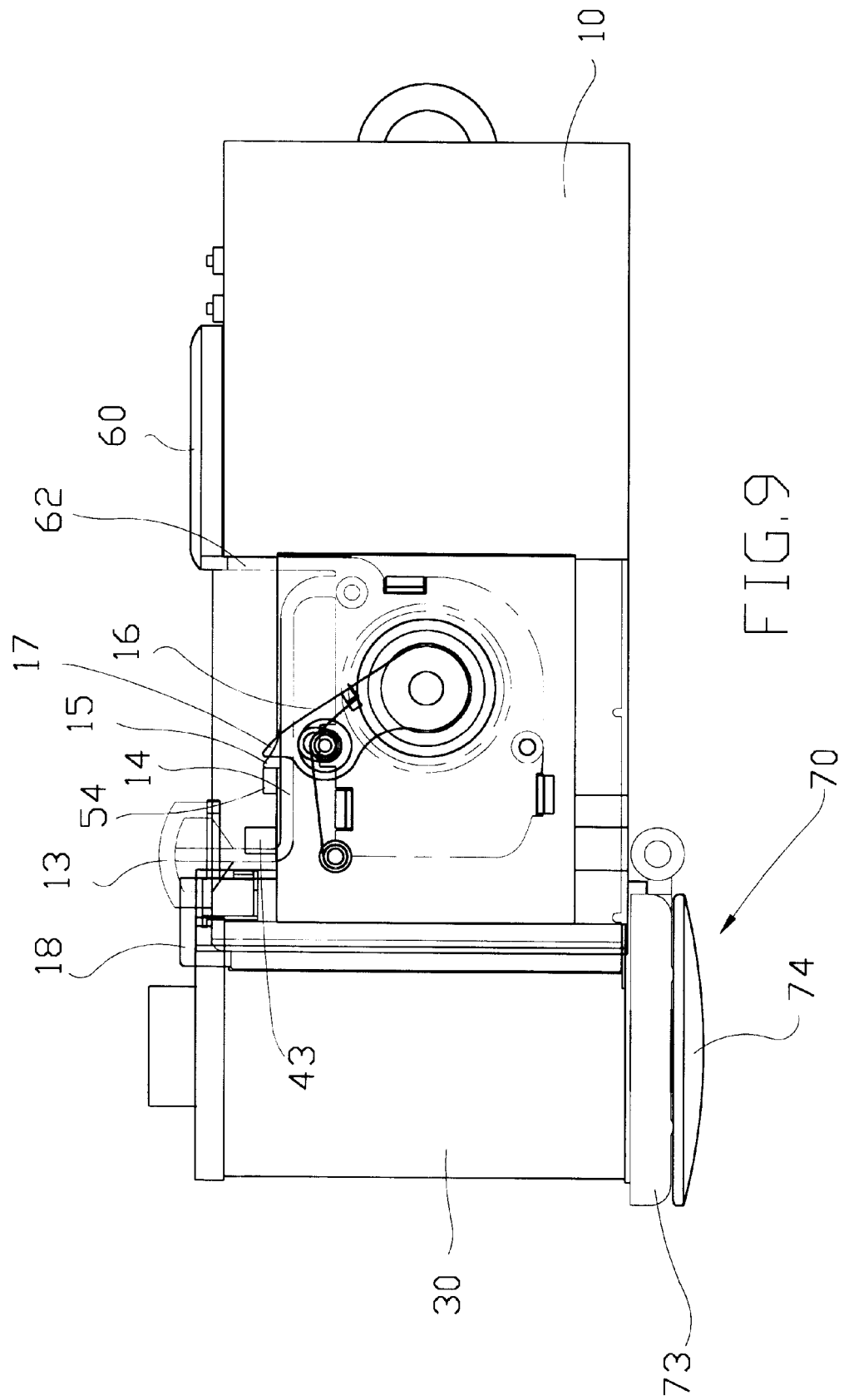
FIG. 9 is a front view of the preferred exterior film-feeding camera in accordance with the present invention at the status.
Figure 10:
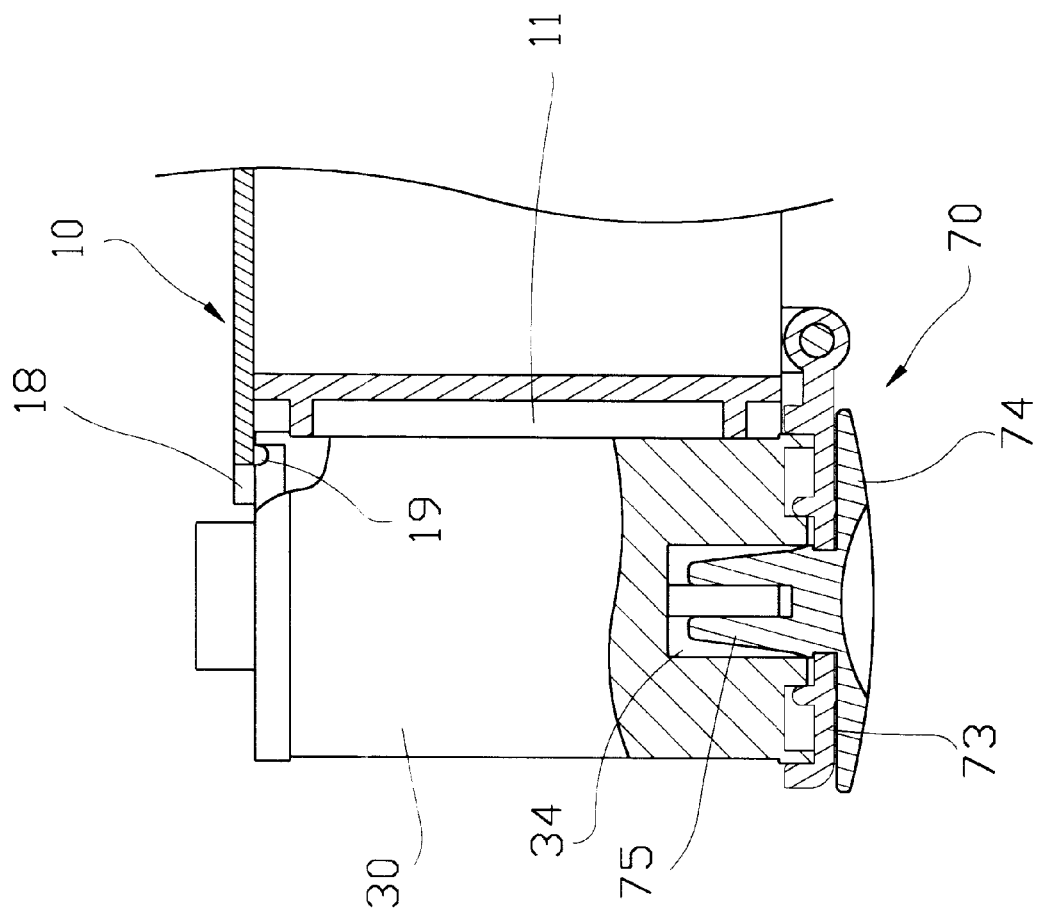
FIG. 10 is a schematic view of a film shell installed in the preferred exterior film-feeding camera in accordance with the present invention.

Referring to FIG. 5, when the film-advancing node 20 is back to its origin, the first claw 25 of the actuating part 22 will move the safety plate 40 at its rear end to have the front end 43 of the safety plate 40 away from the position under the shutter 13. At this stage, the shutter actuating plate 50 is ready for another exposure. During the photo-taking operation, the shutter 13 is depressed to lower down the lever 14 located under the shutter, and thus the front end of the shutter actuating plate 50 can drive the top end 17 of the shutter plate 16 for an exposure. When running out of all films 31 in the dark space, the shutter 13 can't press down the shutter plate 16 for another exposure due to the shutter actuating plate 50 resuming its origin at this time, as the status shown in FIG. 8. Referring to the FIG. 6, if the film-advancing node 20 is mistakenly left at the rotation limit on the right after a film 31 advancing operation, duplicate exposure can be avoided because the front end of the safety plate 40 stays under the shutter 13 at this moment, though the shutter actuating plate 50 is already at the position ready for a new exposure. Only after the film-advancing node 20 is returned back to its origin, another exposure is possible.

The exterior film-feeding camera according to the present invention is especially designed as a manual-driven simple-structured camera who has an exposed film shell 30 mounting space. The main body 10 of the camera has an accommodation space on the left to receive a film shell 30. The accommodation space has a positioning base 70 as its lower bound, and a top plate 18 as its upper bound. The contact surface between the main body 10 and the film shell 30 is arc shaped. The rest of the film shell 30 is exposed to the atmosphere. The film shell 30 is positioned in the accommodation space, by coping two or three restraints 19 locating on the inner surfaces of the positioning base 70 and the top plate 18 with the bottom and the top ends of the film shell 30. Moreover, the film outlet 33 of the film shell 30 and the nozzle inlet 72 of the film-conveying slot 71 on the main body 10 is light-proofed.

Preferably, the positioning base 70 according to the present invention has a hat-shaped part 73 with its opening upwards. Under the hat-shaped part 73, the positioning base 70 further comprises a switch node 74 with its claw 75 on the center towards the hat-shaped part 73. The opening of the hat-shaped part 73 allows the engagement with the bottom end of the film shell 30. Thereby, the claw 75 of the switch node 74 can plug into the pivot hole 34 of the film shell 30.

In addition, the positioning base 70 and the bottom end of the main body 10 are pivotedly connected so that the positioning base 70 can rotate up and down accordingly. After films 31 in the film shell 30 run out, the exposed films 31 can be rolled back to the film shell 30 by rotating the advancing node 74.

The vertical plate 21 driven by the film advancing node 20 is located behind the film-conveying slot 71. Also, an upper groove 76 and a lower groove 77 are located to the upper end and the lower end of the rear wall of the film advancing slot 71, respectively. By protruding from these two grooves 76 and 77, the elastic switching plates 23 and 24 can engage with the punch holes 32 of the film 31.

The exterior film-feeding camera in accordance with the present invention is simply structured, and can accomplish various advantages on shutter safety assurance, readiness of an shutter actuating plate, and exposed film counting. In addition, the volume, the weight, and the low price of the camera is designed to meet the fashion need. Most of all, the inventive film shell locating style and the concise component's movement achieved by the present invention provides the user more convenient and economic camera usage, and also makes possible a new camera application in the future.

While the present invention has been particularly shown and described with reference to a preferred embodiment, it will be understood by those skilled in the art that various changes in form and detail may be without departing from the spirit and scope of the present invention.

I claim:

1. An exterior film-feeding camera, comprising:
    a main body and an exposed space on one side of said main body for anchoring a film shell;
    a vertical plate movably disposed on a rear surface of said main body, said vertical plate contains an elastic upper advancing plate and an elastic lower advancing plate for protruding into corresponding punched holes of a film so as to cause the film to be advanced;
    an actuating member connected to a top end of said vertical plate, said actuating member contains first driving claw, second driving claw, and third driving claw, for driving a shutter safety plate, for triggering a shutter actuating plate connected to a shutter, and for rotating a uni-directional gear for a pre-set angle, respectively; and a film-advancing node provided on a rear surface of said main body which is connected to said vertical plate so as to cause said vertical plate to move horizontally.

2. An exterior film-feeding camera according to claim 1, wherein said shutter safety plate comprises a fluctuating member on a rear part thereof, said fluctuating member and said shutter safety plate are constructed such that a front end of said shutter safety plate is stopped underneath said shutter when said shutter safety plate is free of stress, and when said film-advancing node is at its original position, said first claw of said actuating member is at a position to actuate a rear end of said safety plate to cause said shutter safety plate to rotate about its own center pivot point, and to have the front end of said shutter safety plate moved away from said shutter on top thereof.

3. An exterior film-feeding camera according to claim 1, wherein said shutter actuating plate is pivotedly located at a pivot joint at its center and is restrained by a tension spring connected to a rear end of said shutter actuating plate, said shutter actuating plate is constructed such that when said film advancing node is moved to be ready for another exposure, said second claw will push the rear end of said actuating plate of the shutter to rotate about said pivot joint.

4. An exterior film-feeding camera according to claim 1, wherein said third claw of said actuating member is constructed such that it will rotate said uni-directional gear for said preset angle when said film-switching node moves the film to a film-advancing limit.

5. An exterior film-feeding camera according to claim 1, wherein said main body further comprises a film-advancing slot with an upper groove and a lower groove for receiving said upper elastic advancing plate and said lower elastic advancing plate, respectively, and allowing them to advance.

* * * * *